United States Patent
Nohara et al.

(10) Patent No.: US 9,508,518 B2
(45) Date of Patent: Nov. 29, 2016

(54) FUSE UNIT

(71) Applicant: YAZAKI CORPORATION, Minato-ku, Tokyo (JP)

(72) Inventors: Mami Nohara, Shizuoka (JP); Masayoshi Yamazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/617,248

(22) Filed: Feb. 9, 2015

(65) Prior Publication Data

US 2015/0155125 A1 Jun. 4, 2015

Related U.S. Application Data

(63) Continuation of application No. PCT/JP2013/070998, filed on Aug. 2, 2013.

(30) Foreign Application Priority Data

Aug. 10, 2012 (JP) .................................. 2012-178459

(51) Int. Cl.
| | |
|---|---|
| *H01H 85/02* | (2006.01) |
| *H01M 2/34* | (2006.01) |
| *H01H 85/20* | (2006.01) |
| *H01H 85/12* | (2006.01) |
| *H01M 10/42* | (2006.01) |
| *H01M 10/46* | (2006.01) |
| *H01H 85/044* | (2006.01) |
| *H01H 1/58* | (2006.01) |
| *H01H 85/055* | (2006.01) |

(52) U.S. Cl.
CPC ......... *H01H 85/0241* (2013.01); *H01H 85/12* (2013.01); *H01H 85/205* (2013.01); *H01M 2/34* (2013.01); *H01M 10/425* (2013.01); *H01H 85/044* (2013.01); *H01H 2001/5877* (2013.01); *H01H 2085/025* (2013.01); *H01H 2085/0555* (2013.01); *H01M 10/46* (2013.01); *H01M 2200/103* (2013.01); *H01M 2220/20* (2013.01)

(58) Field of Classification Search
CPC .... H01H 37/32; H01H 37/002; H01H 37/04; H01H 85/205; H01H 2085/0555; H01H 2001/5877; H01H 2085/025; H01H 85/044; H01H 2085/208; H02J 7/0052; H01M 10/441; H01M 2/342; H01M 2/34; H01M 10/46; H01M 2200/103; H01M 2220/20; H01M 2200/30
USPC ....... 337/188, 189, 216, 187, 186, 180, 197, 337/208, 209
See application file for complete search history.

(56) References Cited

U.S. PATENT DOCUMENTS

| | | | |
|---|---|---|---|
| 2002/0163416 | A1 | 11/2002 | Matsumura |
| 2009/0111316 | A1* | 4/2009 | Matsumoto .......... H01H 85/044 439/374 |

(Continued)

FOREIGN PATENT DOCUMENTS

| | | |
|---|---|---|
| JP | 2002-329457 A | 11/2002 |
| JP | 2011-086510 A | 4/2011 |

(Continued)

*Primary Examiner* — Jerry Wu
*Assistant Examiner* — Stephen Sul
(74) *Attorney, Agent, or Firm* — Mots Law, PLLC

(57) ABSTRACT

A first battery connecting end, an alternator connecting end and a second battery connecting end of a circuit body are located at an upper surface portion of a unit body.

17 Claims, 6 Drawing Sheets

(56) References Cited

U.S. PATENT DOCUMENTS

2012/0302098 A1* 11/2012 Matsumoto ............ H01H 85/12
439/620.26
2013/0095696 A1 4/2013 Matsumura et al.

FOREIGN PATENT DOCUMENTS

| JP | 2011-233506 A | 11/2011 |
| JP | 2011-258488 A | 12/2011 |
| JP | 2012-038643 A | 2/2012 |

* cited by examiner

FUSE UNIT

CROSS REFERENCE TO RELATED APPLICATION

This is a continuation application based on PCT application No. PCT/JP2013/070998 filed on Aug. 2, 2013, which claims the benefit of priority from Japanese Patent Application No. 2012-178459 filed on Aug. 10, 2012, the entire contents of which are incorporated by reference herein.

BACKGROUND OF THE INVENTION

1. Field of the Invention

The present invention relates to a fuse unit used for power distribution in a vehicle equipped with two batteries.

2. Description of the Related Art

A fuse unit is directly attached to an onboard battery so as to distribute and supply electricity to loads such as in-vehicle electrical components. Such a fuse unit protects in-vehicle electrical components against an overcurrent by blocking current flow paths. When two batteries are mounted on a vehicle, a fuse unit is directly attached to one of the batteries.

FIGS. 1 and 2 are views showing conventional fuse units 100 and 200, respectively, used in a vehicle on which two batteries are mounted (e.g., Japanese Unexamined Patent Application Publication No. 2011-086510).

The fuse units 100 and 200 include unit bodies 110 and 210 each formed into an L-shape bent substantially at a right angle. The unit bodies 110 and 210 include upper surface portions 111 and 211 each placed and fixed onto the upper surface of a first battery (not shown in the figures) and side surface portions 112 and 212 each positioned along a side surface of the first battery so that the fuse units 100 and 200 are each attached to the first battery in a hanging state.

The unit bodies 110 and 210 include first battery connecting portions 113 and 213, second battery connecting portions 114 and 214, and alternator connecting portions 115 and 215, respectively. In the fuse unit 100 shown in FIG. 1, the first battery connecting portion 113 is located at the upper surface portion 111, and the second battery connecting portion 114 and the alternator connecting portion 115 are located at the side surface portion 112. In the fuse unit 200 shown in FIG. 2, the first battery connecting portion 213 and the alternator connecting portion 215 are located at the upper surface portion 211, and the second battery connecting portion 214 is located at the side surface portion 212.

Outer frames of the unit bodies 110 and 210 are made of an insulating resin. The unit bodies 110 and 210 each include a conductive circuit body including a busbar (not shown in the figures) buried therein. Part of the circuit body necessary for electrical connection is exposed to the outside of each of the unit bodies 110 and 210 as appropriate. In the fuse unit 100 shown in FIG. 1, a first battery connecting end 120 of the circuit body is exposed to the outside on the first battery connecting portion 113. The first battery connecting end 120 is provided with an insertion hole 121 into which a connection bolt of a battery terminal connected to a battery post protruding from the upper surface of the first battery is inserted. The fuse unit 100 is thus connected to the first battery while being fixed onto the upper surface of the first battery. In the fuse unit 200 shown in FIG. 2, a first battery connecting end 220 and an alternator connecting end 240 of the circuit body are exposed to the outside on the first battery connecting portion 213. As in the case of the fuse unit 100 shown in FIG. 1, the first battery connecting end 220 is provided with an insertion hole 221 into which the connecting bolt (not shown in the figure) of the battery terminal connected to the battery post protruding from the upper surface of the first battery is inserted.

The alternator connecting portion 115 of the fuse unit 100 shown in FIG. 1 is provided with an alternator connecting end 140 having an alternator connecting bolt 141. The alternator connecting end 140 is connected to an onboard alternator (not shown in the figure) via a wire. The alternator connecting portion 215 of the fuse unit 200 shown in FIG. 2 is provided with an alternator connecting end 240 having a bolt insertion hole 241. The alternator connecting end 240 is connected to the onboard alternator via a bolt and a wire. The alternator connecting ends 140 and 240 are each connected to the alternator so that the first battery and the second battery are charged with electricity generated by the alternator through driving of the vehicle.

The second battery connecting portions 114 and 214 are each connected to the onboard second battery (not shown in the figures). The fuse unit 100 is provided with a second battery-side connector 131 at a second battery connecting end 130. The second battery-side connector 131 is connected to the second battery via a connector to be mated. The fuse unit 200 is provided with a second battery connecting bolt 231 at a second battery connecting end 230. The second battery connecting bolt 231 is connected to the second battery via a wire.

The fuse units 100 and 200 include load connecting portions 150 and 250 to be connected with loads including in-vehicle electrical components. The load connecting portion 150 of the fuse unit 100 includes load-side connectors 151. The load connecting portion 250 of the fuse unit 200 includes load connecting terminals 251.

The respective fuse units 100 and 200 having the above-described structures include fusible portions (fuses) which are provided for the first battery and the second battery and blow out once an overcurrent flows therethrough so as to prevent the overcurrent from flowing into the first battery and the second battery.

FIG. 3 is a circuit diagram showing the circuit body of the fuse unit 100 provided with the fusible portions. The circuit body of the fuse unit 200 can be illustrated by a similar circuit diagram. As shown in FIG. 3, a first fusible portion 160 is placed between the first battery connecting end 120 (the first battery) and the alternator connecting end 140 (the alternator), and a second fusible portion 170 is placed between the second battery connecting end 130 (the second battery) and the alternator connecting end 140 (the alternator). The alternator connecting end 140 is connected with the load connecting portion 150. Third fusible portions 180 are placed between the load connecting portion 150 and the respective in-vehicle loads 190.

In FIG. 1 and FIG. 2, the corresponding portions in which the first fusible portion and the second fusible portion are located are indicated with the reference numerals 160 and 170, respectively. The first fusible portion 160 and the second fusible portion 170 of the fuse unit 100 are located at the side surface portion 112 of the unit body 110. The first fusible portion 160 of the fuse unit 200 is located at the upper surface portion 211 of the unit body 210, and the second fusible portion 170 is located at the side surface portion 212 of the unit body 210. Such an arrangement is determined depending on the space for each of the fuse units 100 and 200 installed in the vehicle and the configuration of the circuit body (the busbar).

The connection of either the fuse unit 100 or the fuse unit 200 to the first battery, the second battery and the alternator is carried out in the process of assembling the vehicle. With regard to the fuse unit 100, the connecting bolt of the battery terminal connected to the battery post of the first battery is inserted into the first battery connecting end 120 located at the upper surface portion 111. Subsequently, the second battery-side connector 131 located at the side surface portion 112 is fitted to the connector to be mated extending from the second battery so as to be connected to the second battery, and the wire extending from the alternator is fastened to the alternator connecting bolt 141 so that the alternator connecting bolt 141 is connected to the alternator. With regard to the fuse unit 200, the connecting bolt of the battery terminal connected to the battery post of the first battery is inserted into the first battery connecting end 220 located at the upper surface portion 211 so that the first battery connecting end 220 is connected to the first battery, and the bolt connected to the wire extending from the alternator is inserted into the bolt insertion hole 241 of the alternator connecting end 240 so that the alternator connecting end 240 is connected to the alternator. Subsequently, the wire from the second battery is fastened to the second battery connecting bolt 231 located at the side surface portion 212 so that the second battery connecting bolt 231 is connected to the second battery.

The connecting operation described above requires the process of connection of the unit bodies 110 and 210 at the upper surface portions 111 and 212 and also at the side surface portions 112 and 212, which increases the number of steps and complicates the connecting operation. In addition, it is hard to carry out such a connecting operation because it requires the implementation in a small working space.

SUMMARY OF THE INVENTION

An object of the present invention is to provide a fuse unit capable of, in a vehicle equipped with two batteries, reducing the number of steps of connection to the two batteries and an alternator, facilitating the connection to the two batteries and the alternator, and efficiently implementing the connection in a small working space.

An aspect of the present invention is a fuse unit used for a charging circuit installed in a vehicle to charge a first battery and a second battery mounted on the vehicle with electricity generated by a generator through driving of the vehicle, the fuse unit comprising: an insulating unit body; a conducive circuit body integrally buried in the unit body, the circuit body including a first battery connecting end connected to the first battery, an alternator connecting end connected to the generator, and a second battery connecting end connected to the second battery; and a fusible body, connected to the circuit body, for blocking a current flow path when an overcurrent flows therethrough, the fusible body including a first fusible portion provided between the first battery connecting end and the alternator connecting end, a second fusible portion provided between the alternator connecting end and the second battery connecting end, and a third fusible portion provided between the alternator connecting end and an electrical component installed in the vehicle, the first battery connecting end being provided with an insertion hole into which a connecting bolt is inserted, the connecting bolt being attached to a battery terminal connected to a battery post of the first battery and projecting from an upper surface of the first battery, the alternator connecting end being provided with an alternator connecting bolt buried in the unit body and extending in a direction identical with that in which the battery terminal extends, the second battery connecting end being provided with a second battery connecting bolt buried in the unit body and extending in a direction identical with that in which the alternator connecting bolt extends.

According to the aspect of the present invention, the first battery connecting end, a portion at the alternator connecting end into which the alternator connecting bolt is inserted and a portion at the second battery connecting end into which the second battery connecting bolt is inserted, are located on the upper surface of the first battery in a state where the fuse unit is installed in the vehicle, the first fusible portion is located on the upper surface of the first battery, the second fusible portion is located on a side surface of the first battery, and the third fusible portion is located on the side surface of the first battery.

According to the aspect of the present invention, the alternator connecting bolt buried in the unit body and extending in the same direction as the connecting bolt of the battery terminal connected to the battery post is placed at the alternator connecting end, and the second battery connecting bolt buried in the unit body and extending in the same direction as the alternator connecting bolt is placed at the second battery connecting end, so that the first battery connecting end connected to the first battery, the second battery connecting end connected to the second battery and the alternator connecting end connected to the alternator are all located at the upper surface portion of the unit body. Thus, the connection of the fuse unit to the first battery, the second battery and the alternator can be implemented only at the upper surface portion. Accordingly, the connecting operation can be simplified and efficiently carried out in a small working space.

According to the aspect of the present invention, the first fusible portion connecting the first battery connecting end and the alternator connecting end is located on the upper surface of the first battery (at the upper surface portion of the unit body), the second fusible portion connecting the second battery connecting end and the alternator connecting end is located on the side surface of the first battery (at the side surface portion of the unit body), and the third fusible portion connecting the alternator connecting end and the load is located on the side surface of the first battery (at the side surface portion of the unit body). Thus, cover members for covering the first fusible portion, the second fusible portion and the third fusible portion can each be formed into a simple shape.

DESCRIPTION OF THE EMBODIMENTS

Figure 1:
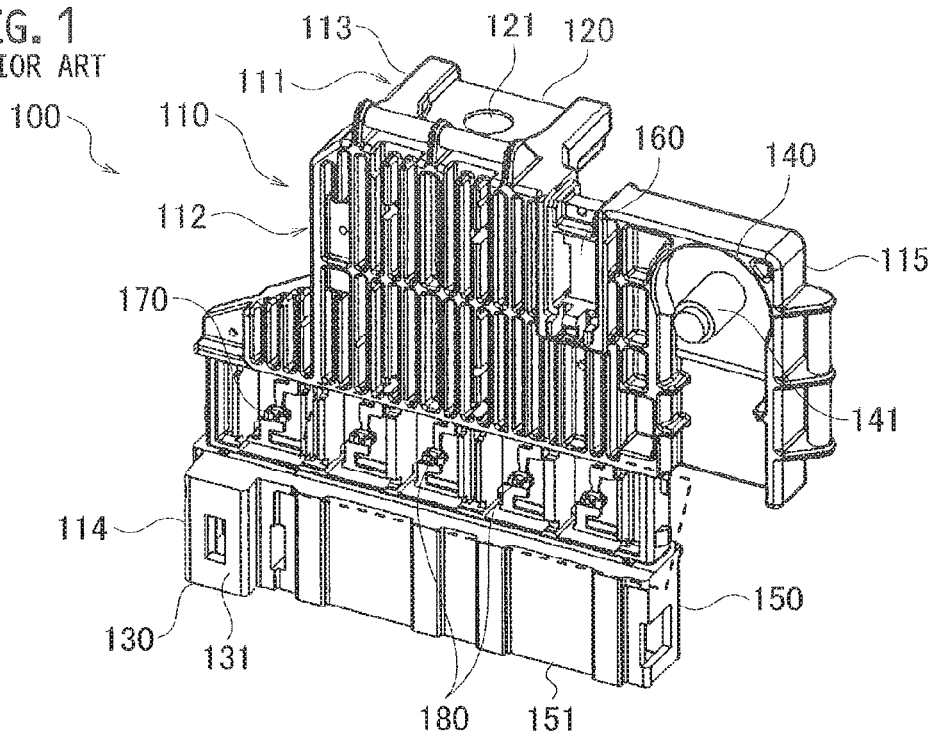
FIG. 1 is a perspective view showing a conventional fuse unit.
Figure 2:
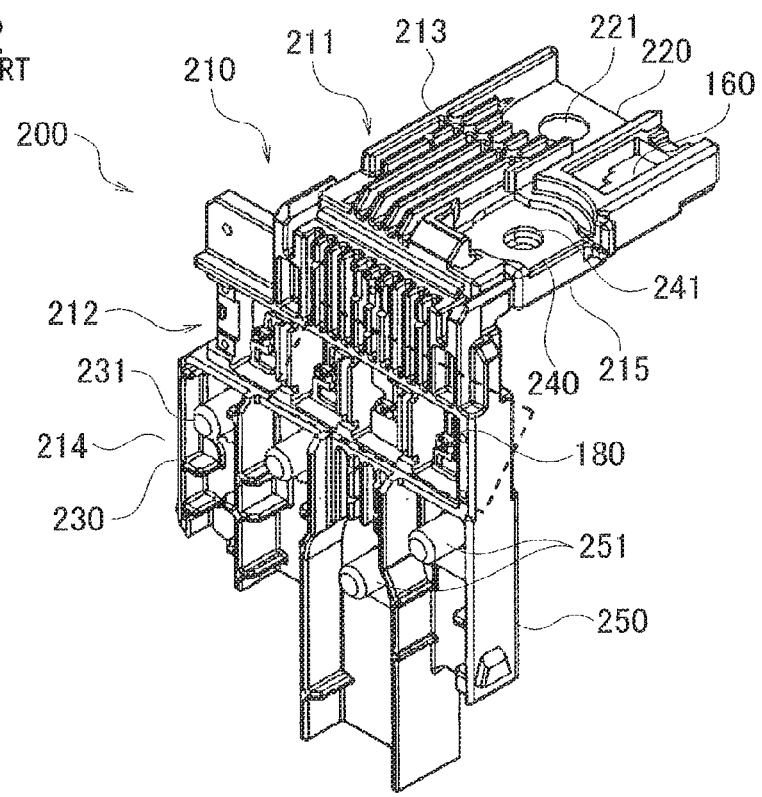
FIG. 2 is a perspective view showing another conventional fuse unit.
Figure 3:
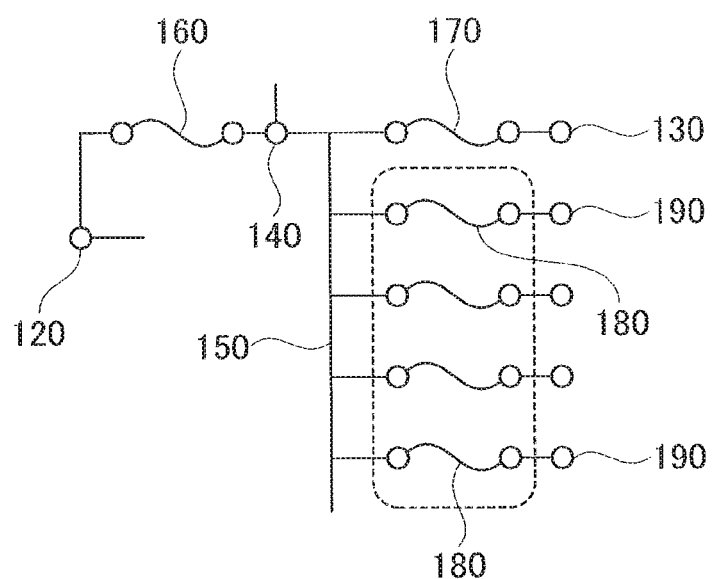
FIG. 3 is a circuit diagram showing a circuit of the conventional fuse unit.

FIG. 4 to FIG. 8 are views each showing a fuse unit 1 according to an embodiment of the present invention.

The fuse unit 1 is used for charging a first battery and a second battery (not shown in the figures) mounted on a vehicle with electricity generated by an alternator (not shown in the figure) through driving of the vehicle. The fuse unit 1 forms a charging circuit for supplying electric current from the first battery, the second battery and the alternator to loads (electrical components) installed in the vehicle.

The fuse unit 1 includes a unit body 3 as an outer frame, a circuit body (a busbar) 5 formed of a conductive metal plate, and a fusible body 7.

The unit body 3 includes an upper surface portion 31 and a side surface portion 32. The unit body 3 is formed into an L-shape such that the side surface portion 32 is bent substantially at a right angle from one end of the upper surface portion 31 and continuously connected to the one end of the upper surface portion 31. The upper surface portion 31 of the unit body 3 is placed and fixed onto the upper surface of the first battery so that the side surface portion 32 is positioned along a side surface of the first battery. The fuse unit 1 is thus attached to the first battery in a hanging state. The unit body 3 is made of an insulating resin.

The upper surface portion 31 of the unit body 3 includes a first battery connecting portion 33, an alternator connecting portion 34 and a second battery connecting portion 35. As described later, the first battery connecting portion 33 is provided with a first battery connecting end 51 of the circuit body 5. The battery connecting end 51 is connected to the first battery via a battery terminal connected to a battery post. The alternator connecting portion 34 is provided with an alternator connecting end 52 of the circuit body 5. The alternator connecting end 52 is connected to the alternator. The second battery connecting portion 35 is provided with a second battery connecting end 53 of the circuit body 5. The second battery connecting end 53 is connected to the second battery. The fuse unit 1 thus has a configuration in which the connecting portions 33 and 35 (the connecting ends 51 and 53 of the circuit body 5) to be connected to the two onboard batteries and the connecting portion 34 (the connecting end 52 of the circuit body 5) to be connected to the onboard alternator are all located at the upper surface portion 31 of the unit body 3. Thus, the connection of the fuse unit 1 to the two batteries and the alternator can be implemented only at the upper surface portion of the unit body 3.

Figure 4:
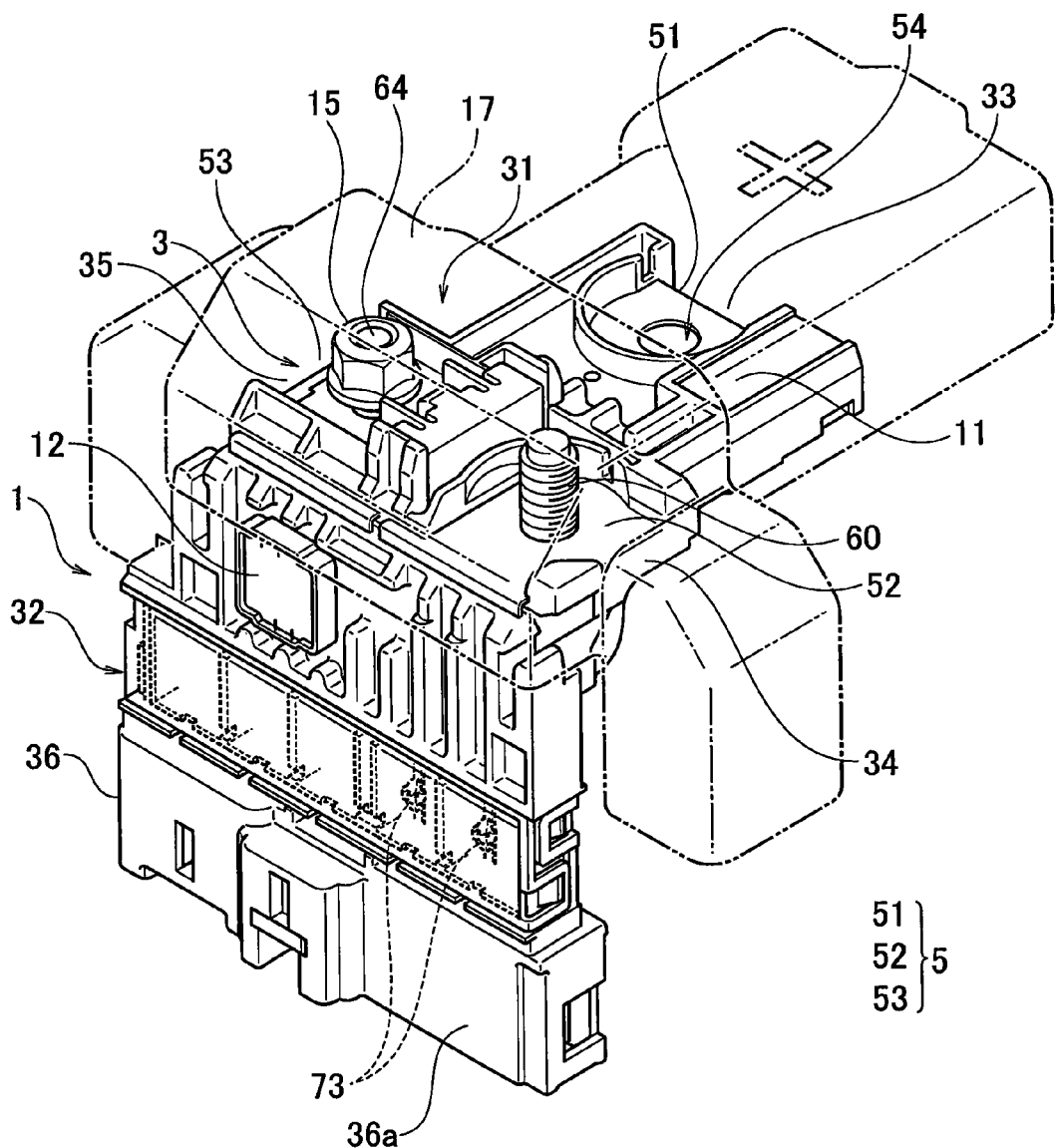
FIG. 4 is a perspective view showing an entire fuse unit according to an embodiment of the present invention.
Figure 5:
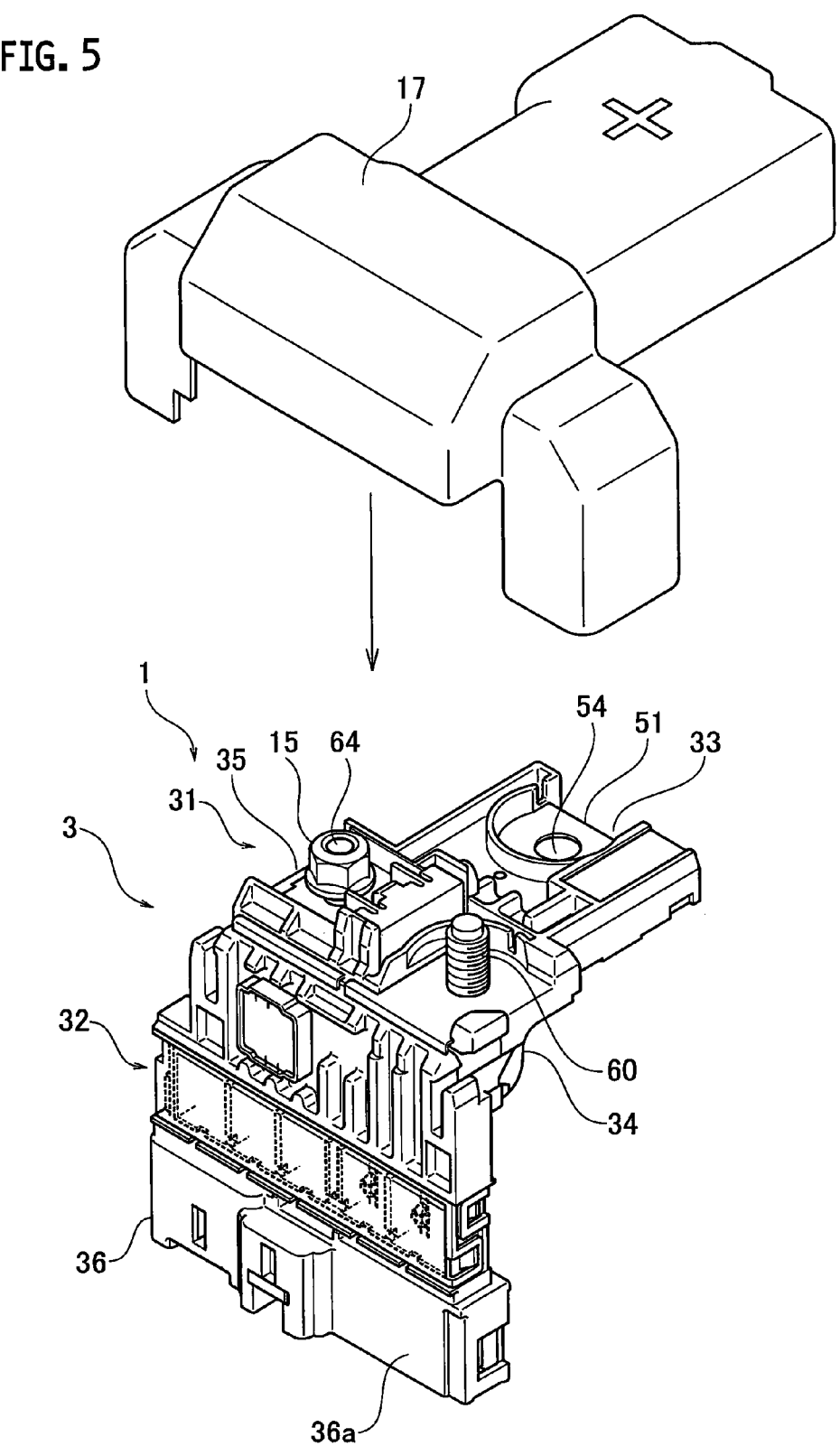
FIG. 5 is a perspective view showing the fuse unit according to the embodiment of the present invention before the fuse unit is covered with a cap.
Figure 6:
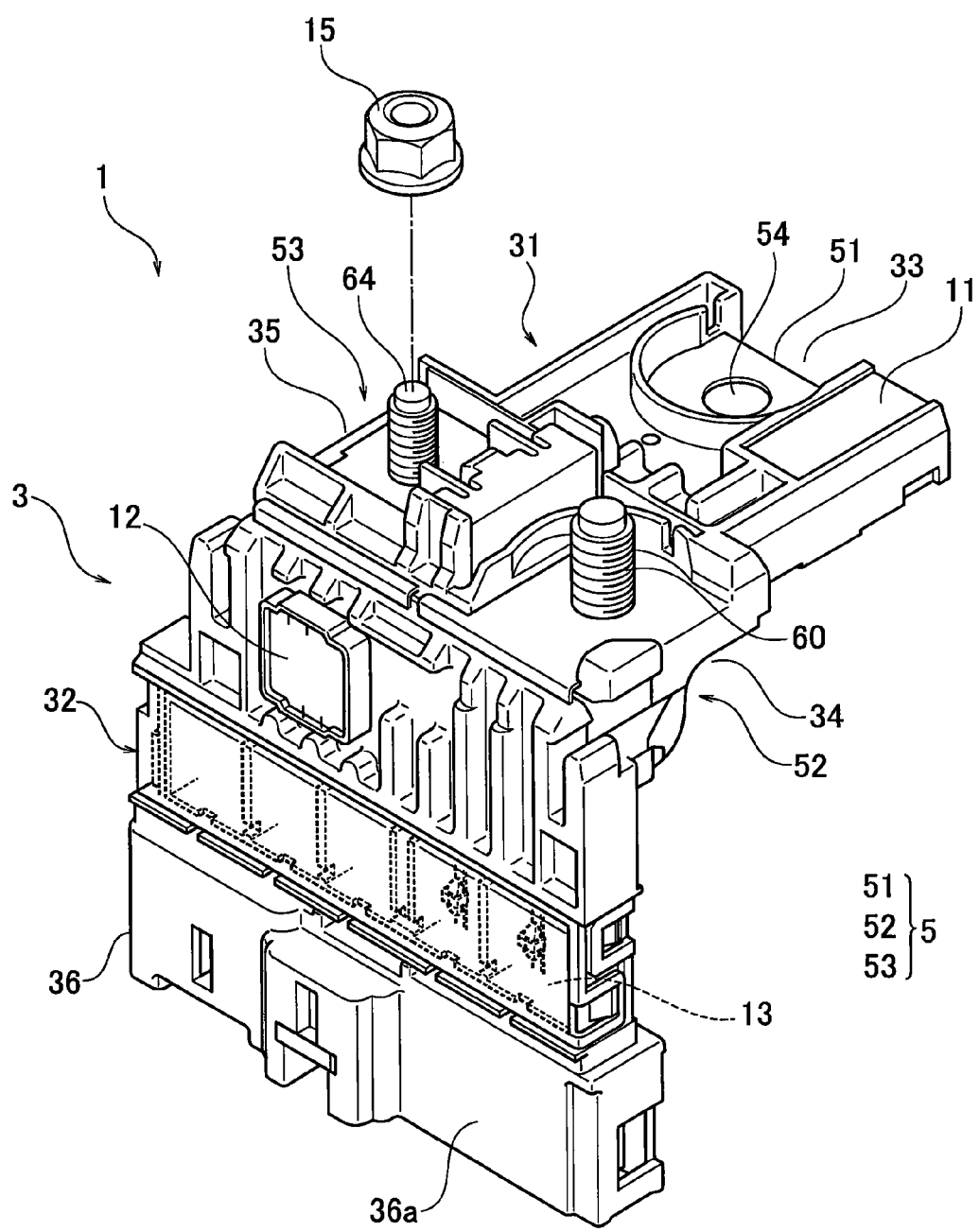
FIG. 6 is a perspective view showing the fuse unit and cover members attached to the fuse unit according to the embodiment of the present invention.

The side surface portion 32 of the unit body 3 is provided with a load connecting portion 36 to be connected with a plurality of onboard loads. Thus, the fuse unit 1 is connected to the onboard loads at the side surface portion 32 of the unit body 3. The load connecting portion 36 has a connector structure into which connectors to be mated from the loads are fitted. A connector housing 36a is shown in FIG. 4 to FIG. 6.

The first battery connecting portion 33, the alternator connecting portion 34 and the second battery connecting portion 35 are located at each apex of a triangle in the upper surface portion 31 of the unit body 3. However, the respective connecting portions may be arranged in line as long as these are located at the upper surface portion 31.

The circuit body 5 is integrally buried in the unit body 3; however, part of the circuit body 5 necessary for electrical connection is exposed to the outside of the unit body 3 as appropriate. As shown in FIG. 4 to FIG. 6, the circuit body 5 includes the first battery connecting end 51 corresponding to the first battery connecting portion 33, the alternator connecting end 52 corresponding to the alternator connecting portion 34, and the second battery connecting end 53 corresponding to the second battery connecting portion 35. The fusible portion 7 is integrated with the circuit body 5 and includes a first fusible portion 71, a second fusible portion 72 and third fusible portions 73.

Figure 7:
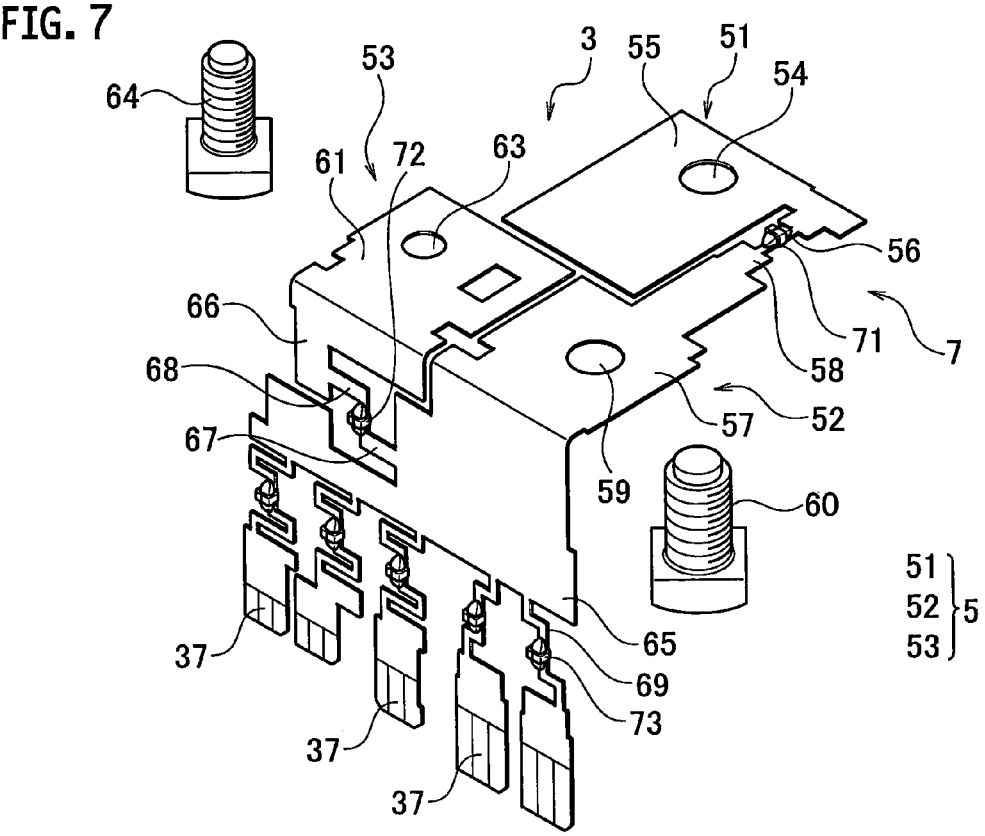
FIG. 7 is a perspective view showing a circuit body according to the embodiment of the present invention.
Figure 8:
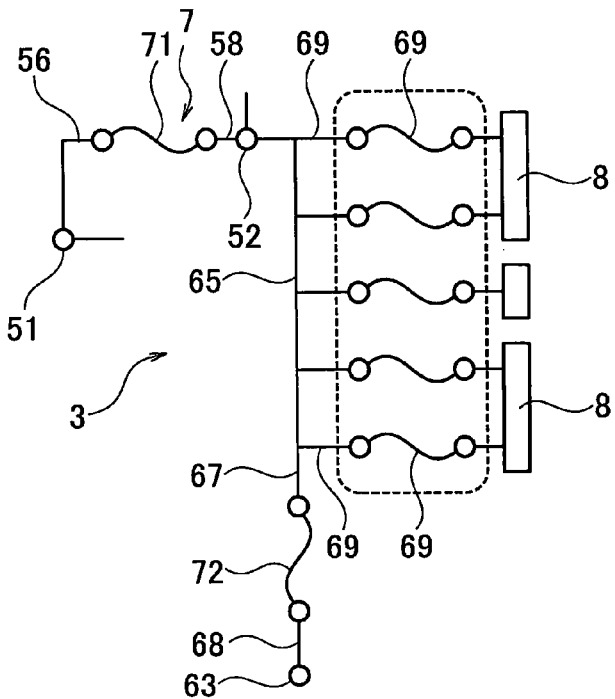
FIG. 8 is a circuit diagram showing a circuit of the circuit body according to the embodiment of the present invention.

FIG. 7 is a view showing the circuit body 5 integrated with the fusible portion 7. FIG. 8 is a diagram showing a circuit configuration of the circuit body 5.

The first battery connecting end 51 includes a plate-like first battery terminal portion 55 provided with an insertion hole 54, and an alternator-side terminal portion 56 aligned and connected with the first battery terminal portion 55. A connecting bolt of the battery terminal (not shown in the figures) connected to the battery post of the first battery is inserted into the insertion hole 54. The connecting bolt is attached to the battery terminal in such a manner as to project from the upper surface of the first battery. The first battery connecting end 51 is thus connected to the first battery through the insertion of the connecting bolt.

The alternator connecting end 52 includes a plate-like alternator terminal portion 57, and a first battery-side terminal portion 58 extending from the alternator terminal portion 57 toward the alternator-side terminal portion 56 of the first battery connecting end 51. The alternator terminal portion 57 is provided with a bolt insertion hole 59. An alternator connecting bolt 60 is inserted and attached into the bolt insertion hole 59. The alternator connecting bolt 60 is attached to the alternator terminal portion 57 in such a manner as to extend upward in the same direction as the battery terminal of the first battery. The alternator connecting bolt 60 has a lower portion buried in the upper surface portion 31 of the unit body 3. The alternator connecting bolt 60 is connected to the onboard alternator via a wire. The alternator connecting end 52 is thus connected to the alternator.

The first battery-side terminal portion 58 of the alternator connecting end 52 faces the alternator-side terminal portion 56 of the first battery connecting end 51. These terminal portions 58 and 56 are connected to each other via the first fusible portion 71 of the fusible body 7. Since the first battery connecting end 51 is connected to the alternator via the alternator connecting end 52, the first battery connected with the first battery connecting end 51 is charged by the alternator. The first fusible portion 71 blows out once an overcurrent from the alternator flows therethrough so as to protect the circuit body 5 and prevent the overcurrent from flowing into the first battery.

The second battery connecting end 53 includes a plate-like second battery terminal portion 61 aligned with the alternator terminal portion 57 of the alternator connecting end 52. The second battery terminal portion 61 is provided with a bolt insertion hole 63. A second battery connecting bolt 64 is inserted and attached into the bolt insertion hole 63. The second battery connecting bolt 64 has a lower portion buried in the upper surface portion 31 of the unit body 3. The second battery connecting bolt 64 is attached to the second battery terminal portion 61 in such a manner as to extend upward in the same direction as the alternator connecting bolt 60, namely, in the same direction as the battery terminal of the first battery. The second battery connecting bolt 64 is connected to the second battery via a wire. The second battery connecting end 53 is thus connected to the second battery. Here, the wire from the second battery is connected to the second battery connecting bolt 64 in a manner such that a fastening nut 15 made of an insulating resin such as nylon (trade name) is screwed onto the second battery connecting bolt 64.

As described above, the alternator connecting bolt 60 extends in the same direction as the battery terminal of the first battery, and the second battery connecting bolt 64 extends in the same direction as the alternator connecting bolt 60. Thus, the alternator connecting end 52 and the second battery connecting end 53 are located at the upper surface portion 31 of the unit body 3 in the same manner as the first battery connecting end 51.

The alternator connecting end 52 is integrated with a plate-like load-side terminal portion 65 bent substantially at a right angle and hanging from the alternator terminal portion 57. The second battery connecting end 53 is integrated with a plate-like connecting terminal portion 66 bent substantially at a right angle and hanging from the second battery terminal portion 61. The load-side terminal portion 65 and the connecting terminal portion 66 are located at the side surface portion 32 of the unit body 3.

The load-side terminal portion 65 of the alternator connecting end 52 and the connecting terminal portion 66 of the second battery connecting end 53 are provided with a second battery-side terminal portion 67 and an alternator-side terminal portion 68, respectively, extending in a direction coming closer together. These terminal portions 67 and 68 are connected to each other via the second fusible portion 72 of the fusible body 7. Since the second battery connecting end 53 is connected to the alternator via the alternator connecting end 52, the second battery connected with the second battery connecting end 53 is charged by the alternator. The second fusible portion 72 blows out once an overcurrent from the alternator flows therethrough so as to protect the circuit body 5 and prevent the overcurrent from flowing into the second battery.

The load-side terminal portion 65 of the alternator connecting end 52 is integrated with a plurality of connecting terminals 69. The respective connecting terminals 69 face connector connecting terminal portions 37 located in the connector housing 36a of the unit body 3. The connecting terminals 69 are connected to the connector connecting terminal portions 37 via the third fusible portions 73 of the fusible body 7. The connector connecting terminal portions 37 are connected to the onboard loads 8 (FIG. 8) via the connectors to be mated. Thus, the current from the alternator is supplied to the onboard loads 8. The third fusible portions 73 each blow out once an overcurrent from the alternator flows therethrough so as to protect the loads against the overcurrent.

According to the present embodiment, the alternator connecting bolt 60 attached to the alternator connecting end 52 has a different diameter from the second battery connecting bolt 64 attached to the second battery connecting end 53. Thus, incorrect assembly between the alternator and the second battery can be avoided.

In the fuse unit 1, the alternator connecting bolt 60 connected to the alternator extends in the same direction as the battery terminal projecting from the upper surface of the first battery, and the second battery connecting bolt 64 connected to the second battery extends in the same direction as the alternator connecting bolt 60. Namely, the alternator connecting bolt 60 and the second battery connecting bolt 64 extend in the same direction as the battery terminal of the first battery. Thus, the first battery connecting end 51 of the circuit body 5 to be connected to the first battery, the second battery connecting end 53 of the circuit body 5 to be connected to the second battery, and the alternator connecting end 52 of the circuit body 5 to be connected to the alternator are all located at the upper surface portion 31 of the unit body 3. Accordingly, the connection of the fuse unit 1 to the first battery, the second battery and the alternator can be implemented only at the upper surface portion 31 of the unit body 3. As a result, the connecting operation can be simplified and efficiently carried out in a small working space.

The first battery connecting end 51, the alternator terminal portion 57 of the alternator connecting end 52 into which the alternator connecting bolt 60 is to be inserted, and the second battery terminal portion 61 of the second battery connecting end 53 into which the second battery connecting bolt 64 is to be inserted are located at the upper surface portion 31 of the unit body 3. Thus, the first battery connecting end 51, the alternator terminal portion 57 and the second battery terminal portion 61 are located on the upper surface of the first battery in the state where the fuse unit 1 is installed in the vehicle. Thereby, the fuse unit 1 has a configuration in which the first fusible portion 71 connecting the first battery connecting end 51 and the alternator connecting end 52 is located on the upper surface of the first battery (at the upper surface portion 31 of the unit body 3), the second fusible portion 72 connecting the second battery connecting end 53 and the alternator connecting end 52 is located on the side surface of the first battery (at the side surface portion 32 of the unit body 3), and the third fusible portions 73 connecting the alternator connecting end 52 and the respective loads 8 are located on the side surface of the first battery (at the side surface portion 32 of the unit body 3). Accordingly, cover members for covering the first fusible portion 71, the second fusible portion 72 and the third fusible portions 73 can each be formed into a simple shape.

In particular, as shown in FIG. 6, a first cover member 11 formed substantially into a U-shape for covering the first fusible portion 71 is inserted into a portion where the first fusible portion 71 is arranged at the upper surface portion 31 of the unit body 3 so as to cover the first fusible portion 71. With regard to the second fusible portion 72, a pair of plate-like second cover members 12 is inserted into a portion where the second fusible portion 72 is arranged at the side surface portion 32 of the unit body 3 so as to cover the second fusible portion 72. With regard to the third fusible portions 73, a third cover member 13 formed into a box shape elongated in the lateral direction is arranged over the side surface portion 32 of the unit body 3 so as to cover the third fusible portions 73.

As shown in FIG. 4 and FIG. 5, the fuse unit 1 is covered, from above, with a cap 17 made of an insulating resin. The cap 17 is formed into a shape to cover the entire upper surface portion 31 of the unit body 3. The first battery connecting end 51, the alternator connecting bolt 60 and the second battery connecting bolt 64 are covered with the cap 17 in the state where the fuse unit 1 is fixed to the first battery. Thus, the fuse unit 1 can be protected against rainwater or dust.

What is claimed is:
1. A fuse unit used for a charging circuit installed in a vehicle to charge a first battery and a second battery mounted on the vehicle with electricity generated by a generator through driving of the vehicle, the fuse unit comprising:
  an insulating unit body;
  a conductive circuit body integrally buried in the unit body, the circuit body including a first battery connecting end connected to the first battery,
an alternator connecting end connected to the generator, and
a second battery connecting end connected to the second battery; and
a fusible body, connected to the circuit body, for blocking a current flow path when an overcurrent flows therethrough, the fusible body including
a first fusible portion provided between the first battery connecting end and the alternator connecting end,
a second fusible portion provided between the alternator connecting end and the second battery connecting end, and
a third fusible portion provided between the alternator connecting end and an electrical component installed in the vehicle,
the first battery connecting end being provided with an insertion hole into which a connecting bolt is inserted, the connecting bolt being attached to a battery terminal connected to a battery post of the first battery and projecting from an upper surface of the first battery,
the alternator connecting end being provided with an alternator connecting bolt buried in the unit body and extending in a direction identical with that in which the battery terminal extends,
the second battery connecting end being provided with a second battery connecting bolt buried in the unit body and extending in a direction identical with that in which the alternator connecting bolt extends, wherein
the alternator connecting end comprises an integrated plate-like load-side terminal portion bent substantially at a right angle and hanging from an alternator terminal portion,
the second battery connecting end comprises an integrated plate-like connecting terminal portion bent substantially at a right angle and hanging from a second battery terminal portion,
the load-side terminal portion of the alternator connecting end and the connecting terminal portion of the second battery connecting end are provided with a second battery-side terminal portion and an alternator-side terminal portion, respectively, extending in a direction coming closer together,
the second battery-side terminal portion and the alternator-side terminal portion are connected to each other via the second fusible portion, and
the second battery connecting end is connected to the generator via the alternator connecting end such that the second battery connected with the second battery connecting end is charged by the generator and the second fusible portion prevents an overcurrent from flowing into the second battery.

2. The fuse unit according to claim 1, wherein:
the first battery connecting end, a portion at the alternator connecting end into which the alternator connecting bolt is inserted and a portion at the second battery connecting end into which the second battery connecting bolt is inserted, are located on the upper surface of the first battery in a state where the fuse unit is installed in the vehicle;
the first fusible portion is located on the upper surface of the first battery;
the second fusible portion is located on a side surface of the first battery; and
the third fusible portion is located on the side surface of the first battery.

3. The fuse unit according to claim 1, wherein:
the insulating unit body comprises an upper surface portion and a side surface portion,
the insulating unit body comprises an L-shape formed such that the side surface portion is bent substantially at a right angle from one end of the upper surface portion and is continuously connected to the one end of the upper surface portion, and
the upper surface portion is placed and fixed onto the upper surface of the first battery such that the side surface portion is positioned along the side surface of the first battery.

4. The fuse unit according to claim 3, wherein:
the first battery connecting end, the alternator connecting end and the second battery connection end are all located at the upper surface portion of the insulating unit body such that the connection of the fuse unit to the first battery, the second battery and the generator are implemented at the upper surface portion of the insulating unit body.

5. The fuse unit according to claim 3, wherein:
the side surface portion of the insulating unit body is provided with a load connecting portion to be connected with a plurality of loads such that the fuse unit is connected to the plurality of loads at the side surface portion of the insulating unit body.

6. The fuse unit according to claim 3, wherein
the load-side terminal portion and the connecting terminal portion are located at the side surface portion of the insulating unit body.

7. The fuse unit according to claim 3, further comprising a cap made of an insulating resin and having a shape to cover the entire upper surface portion of the insulating unit body, wherein
the first battery connecting end, the alternator connecting bolt and the second battery connecting bolt are covered with the cap in the state where the fuse unit is fixed to the first battery.

8. The fuse unit according to claim 1, wherein:
the first battery connecting portion, the alternator connecting portion and the second battery connecting portion are located respectively at each apex of a triangle in the upper surface portion of the insulating unit body.

9. The fuse unit according to claim 1, wherein:
the first battery connecting portion, the alternator connecting portion and the second battery connecting portion are located in line in the upper surface portion of the insulating unit body.

10. The fuse unit according to claim 1, wherein
the alternator-side terminal portion is aligned and connected with the first battery terminal portion,
the first battery connecting end comprises a plate-like first battery terminal portion provided with an insertion hole,
the connecting bolt projects from the upper surface of the first battery by insertion into the insertion hole, and
the first battery connecting end is connected to the first battery through the connecting bolt.

11. The fuse unit according to claim 1, wherein
the alternator terminal portion is provided with a bolt insertion hole, and
the alternator connecting end comprises a first battery-side terminal portion extending from the alternator terminal portion toward the alternator-side terminal portion of the first battery connecting end.

12. The fuse unit according to claim 11, wherein
the first battery-side terminal portion of the alternator connecting end faces the alternator-side terminal portion of the first battery connecting end,
the first battery-side terminal portions and the alternator-side terminal portion are connected to each other via the first fusible portion of the fusible body, and
the first battery connecting end is connected to the generator via the alternator connecting end such that the first battery connected with the first battery connected end is charged by the generator and the first fusible portion prevents an overcurrent from flowing into the first battery.

13. The fuse unit according to claim 1, wherein
the second battery terminal portion is provided with a bolt insertion hole, and
the second battery terminal portion is aligned with the alternator terminal portion of the alternator connecting end.

14. The fuse unit according to claim 1, wherein
the load-side terminal portion of the alternator connecting end comprises a plurality of connecting terminals integrally connected therewith,
respective ones of the plurality of connecting terminals face connector connecting terminal portions located in a connector housing of the insulating unit body,
the connecting terminals are connected to the connector connecting terminal portions via the third fusible portion,
the connector connecting terminal portions are connected to onboard loads such that current from the generator is supplied to the onboard loads and respective fusible portions of the third fusible portion protect the onboard loads against an overcurrent.

15. The fuse unit according to claim 1, wherein
the alternator connecting bolt attached to the alternator connecting end has a different diameter from the second battery connecting bolt attached to the second battery connecting end.

16. The fuse unit according to claim 1, wherein the first fusible portion, the second fusible portion and the third fusible portions comprise cover members for covering the first fusible portion, the second fusible portion and the third fusible portions.

17. The fuse unit according to claim 16, wherein
the cover members comprise a first cover member covering the first fusible portion, a pair of plate-like second cover members covering the second fusible portion, and a third cover member covering the third fusible portion, and
the first cover member comprises a U-shape covering the first fusible portion, and the third cover member comprises a box shape elongated in the lateral direction covering the third fusible portion.

\* \* \* \* \*